United States Patent [19]
Michal

[11] 4,020,584
[45] May 3, 1977

[54] MAGNETIC FLOATING FISHING TACKLE BOX

[76] Inventor: Dorothy Hamilton Michal, 14544 Cleveland Ave., Posen, Ill. 60469

[22] Filed: Dec. 8, 1975

[21] Appl. No.: 638,649

[52] U.S. Cl. .......................................... 43/57.5 R
[51] Int. Cl.² ...................................... A01K 97/06
[58] Field of Search ............ 43/54.5 R, 57.5 R, 26; 206/523, 524; 220/21, 23

[56] References Cited
UNITED STATES PATENTS

| | | | |
|---|---|---|---|
| 3,197,915 | 8/1965 | Starer | 43/57.5 R |
| 3,512,295 | 5/1970 | LaBarge | 43/57.5 R |
| 3,769,741 | 11/1973 | Hessler | 43/57.5 R |
| 3,780,468 | 12/1973 | Maffett | 43/54.5 R |
| 3,889,805 | 6/1975 | Korten | 43/54.5 R |

Primary Examiner—Warner H. Camp
Attorney, Agent, or Firm—Sabin C. Bronson

[57] ABSTRACT

A fishing tackle box, in form, similar to an attache case, the shells of which are molded of scuff-resistant vinyl, thermoplastic, or like material. Within the shells are blocks of molded Styrofoam or the like, to provide buoyancy for the box, should it accidentally fall into a body of water. The styrofoam material is molded about spaced strips of magnetized material so as to hold fish lures, tackle etc., thereto. Openings in the styrofoam provide space for reels, sinkers, lines, and other non-metallic materials carried in the box. The box is thus magnetic, and buoyant and would float and hold the tackle etc., in the box even though it fell in the water open.

1 Claim, 4 Drawing Figures

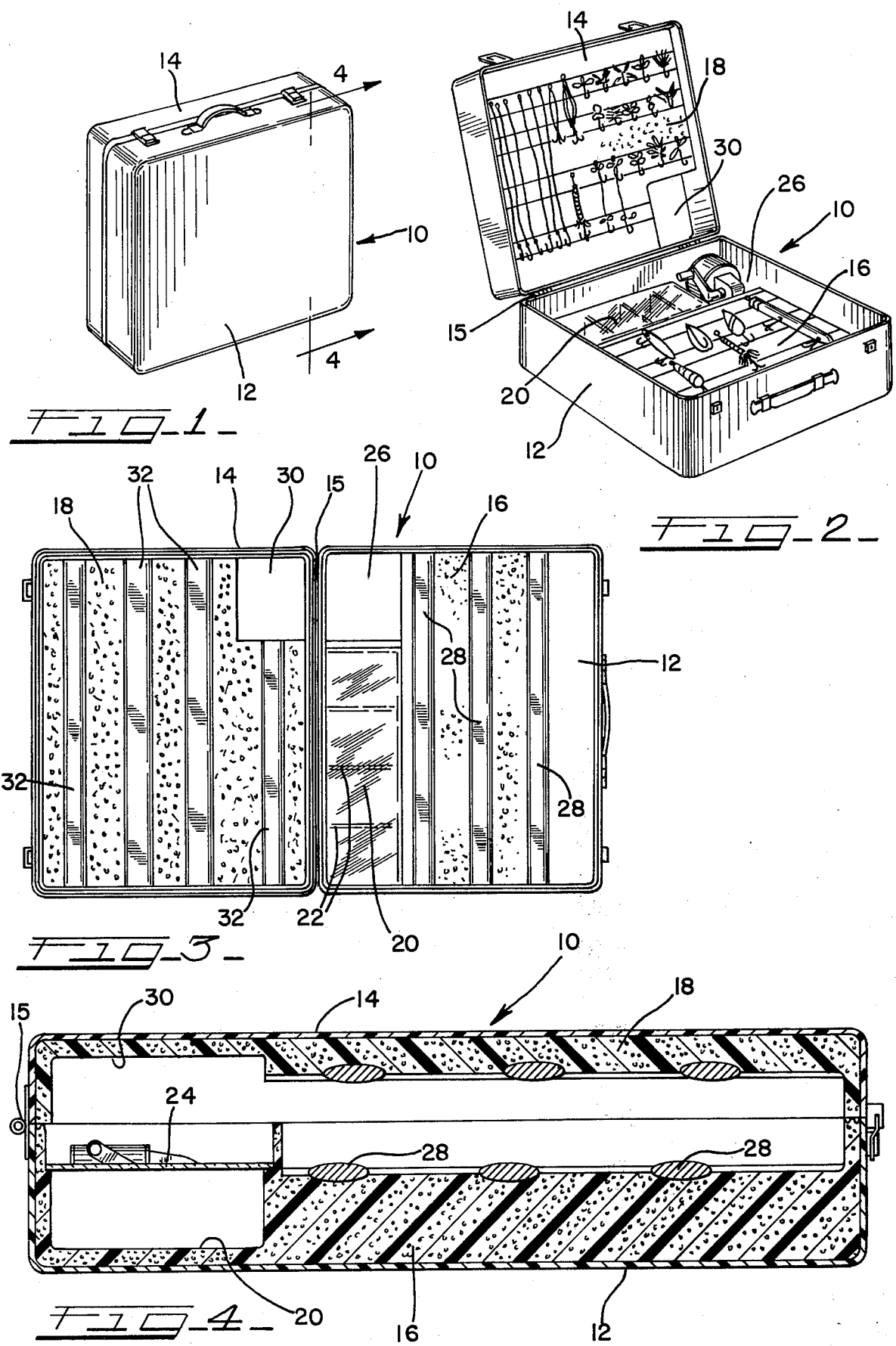

MAGNETIC FLOATING FISHING TACKLE BOX

BACKGROUND OF THE INVENTION

Fish tackle boxes which are constructed of Styrofoam or cork therein to provide a box which would float if accidentally dropped in a body of water are not new as shown in U.S. Pat. No. 3,769,741. They do float if dropped into a body of water, but if the cases are open when dropped into the water, there is nothing to prevent the tackle, etc., carried in the box from falling out of the box and sinking to the bottom of the body of water.

Therefore, this invention provides a series of magnetized rods so that the metal parts of the line or reel can be attracted by the magnets and held thereto so as not to lose fishing tackle or the like should the tackle box fall into the body of water.

BRIEF DESCRIPTION OF THE DRAWINGS

FIG. 1 is a perspective view of the tackle box as it would appear in closed position.

FIG. 2 is a perspective view of the tackle box as it appears open.

FIG. 3 is a plan view of the tackle box open, and

FIG. 4 is a cross sectional view of the box on the line 4—4 of FIG. 1.

DESCRIPTION OF THE PREFERRED EMBODIMENT

The tackle box is shown generally at 10 and when closed has the appearance of an attache case, comprising a bottom shell 12 and a cover shell 14, hinged together with a hinge 15.

Within each of these shells is a preformed block of Styrofoam or like bouyant material 16 and 18, fitted tightly within the shells. The margin walls of the blocks 16 and 18 meet when the box is closed as shown in FIG. 4. At the hinged end of the box, a well 20 is formed in the block 16, which well extends across from side to side of the bottom 12 of the box as shown in FIGS. 2 and 3. A plurality of partitions 22 extend across the well 20, dividing the same into small compartments wherein may be carried sinkers, line, and small equipment used in keeping the tackle in good order, etc. A cover 24 is frictionally held over the smaller compartments since a good deal of the equipment carried therein is not responsive to magnets to hold them in place. The cover 24 does not extend over the last or larger of the compartments 26, and this compartment is provided for the carrying of reels or the like.

On the exposed surface of the Styrofoam block 16 is a series of magnetic strips 28 which are spaced from each other and extend from side to side of the bottom of the box. These strips 28 are for the purpose of holding any loose lures or tackle in the box even though it tips over accidentally.

As before stated the cover shell 14 is closely fitted with a preformed block of Styrofoam or the like 18, and when passed firmly therein stays in place.

This cover block 18 is provided with a corner well 30 corresponding in size with the well 26 so that when the cover 14 of the box is closed, the wells 30 and 26 are opposed. Thus a reel, for example, which may be of greater dimension than the depth of the well 26 may be placed therein and when the cover is closed the reel would project up into the well 30.

The surface of the block 18 is also provided with a plurality of magnetic spaced, parallel rods 32 which extend from side to side of the cover shell 14. The various leader lines, hooks, spoons, flies, and the like, usually found in tackle boxes may be carried therein by placing the same against the magnetic bars 32, as indicated in FIG. 2, and against when bars such tackle will stay magnetically attached until removed manually.

While a preferred embodiment of the invention has been illustrated and described with the required particularity, variations and modifications in structure within the scope of the appended claims may be resorted to without departing from the spirit of the invention.

What is claimed is:

1. A fishing tackle box comprising in combination a bottom shell and a cover shell hingedly connected together, preformed blocks of buoyant plastic material fitted within each shell to provide floatability to the box, spaced magnetized strips molded in said buoyant blocks to hold fish hooks and lines thereto magnetically, said buoyant material in said shells each having a well therein opposite each other for carrying a reel or the like therein, said buoyant material in the bottom shell having a series of smaller compartments formed therein along one wall thereof for carrying non-magnetic fishing material therein, and a removable cover frictionally held over the smaller compartments to hold the contents thereof in place.

* * * * *